Aug. 10, 1965 J. T. LLOYD 3,199,505
CATALYTIC COMBUSTOR TYPE HEATING DEVICES
Filed May 9, 1962 4 Sheets-Sheet 1

INVENTOR.
JOHN THOMAS LLOYD
BY
George C Sullivan
Agent

3,199,505
CATALYTIC COMBUSTOR TYPE HEATING DEVICES

John Thomas Lloyd, Glendale, Calif., assignor to Lockheed Aircraft Corporation, Burbank, Calif., a corporation of California
Filed May 9, 1962, Ser. No. 193,416
3 Claims. (Cl. 126—95)

This invention pertains to new and improved catalytic combustor type heating devices or catalytic combustors.

It is well-known that when a mixture of a vaporous fuel and another material capable of reacting with this fuel are passed in contact with a catalyst bed maintained at a suitable temperature that combustion will take place between these reactants without the production of a flame, and that heat is the product of such combustion. This knowledge is commonly utilized in combustion heaters which are constructed in such a manner that a liquid hydrocarbon fuel is vaporized and is mixed with air containing oxygen and then is passed over a bed of a suitable catalyst such as, for example, a catalyst containing platium or platinum chloride maintained by reactions at the catalyst's surface at an elevated temperature above about 400° F. and preferably a temperature of about 700° F. These prior catalytic devices are commonly referred to as catalytic combustor type heating devices.

For many different applications prior catalytic combustors as are briefly indicated in the preceding are disadvantageous. This is primarily a consequence of the fact that such prior catalytic combustors cannot adequately be controlled from a temperature stand-point so that the quantity of heat given off from them can be accurately varied, depending upon the needs for such heat. Further, these prior catalytic combustors as a class are frequently disadvantageous because of the various different manners in which they must be started so that their operation is self-sustaining. Thus, for example, many prior catalytic combustors are not used in various "critical" locations because they require combustion of a volatile solvent in a catalytic bed in order to raise this bed to a sufficient temperature so that it will operate in its intended manner.

An object of the present invention is to provide new and improved catalytic combustors.

A more specific object of the present invention is to provide catalytic combustors which are capable of being controlled so that the quantity of heat given off during the operation of these combustors can be varied depending upon the amount of heat needed for a specific application.

Another object of the present invention is to provide catalytic combustors in which means are provided so that these devices may be easily started with a minimum of difficulty and effort in order to become self-sustaining without there being any hazard involved in starting these devices.

Further objects of the present invention are to provide catalytic combustors as are briefly described in the preceding paragraph which may be easily constructed, which are relatively inexpensive to manufacture, which are capable of performing satisfactorily and which may be easily and conveniently used.

These and various further objects of the present invention will be more fully apparent from a detailed consideration of the remainder of this specification including the appended claims and accompanying drawings in which:

From a consideration of the accompanying drawings and of this specification it will be realized that these drawings are primarily intended so as to clearly convey the nature of certain presently preferred embodiments or forms of catalytic combustors of the present invention in such a manner that those skilled in the field of these combustors can readily understand the construction of these devices and the nature of the present invention. It will also be realized from a consideration of these drawings that the drawings themselves are not intended so as to indicate the precise dimensions, shapes or the like of variously differently constructed catalytic combustors which may be designed so as to utilize the principles of this invention as set forth or defined in the appended claims forming a part of this disclosure.

As an aid to understanding this invention it can be stated in essentially summary form that it concerns catalytic combustors each of which has a housing which contains a fuel chamber and a passage extending upwardly from the fuel chamber which is adapted to convey fuel serving as a reactant; a catalyst bed located at the upper extremity of the passage; and the means for introducing a gaseous reactant (capable of reacting with the fuel employed) into the passage between the fuel chamber and the catalyst bed. Preferably devices of the present invention also include means whereby the catalyst bed may be heated to a desired operating temperature at which it will become operative to cause combustion of a vaporous reactant mixture and means for heating the fuel employed in this mixture so as to cause its vaporization if this is necessary, as well as means for operating both of these heating means in accordance with the desired manner of operation of the complete combustor. Preferably a catalytic combustor of the present invention also includes means for regulating the quantity of fuel which passes in vapor form through the passage to the catalyst bed.

Figure 1:
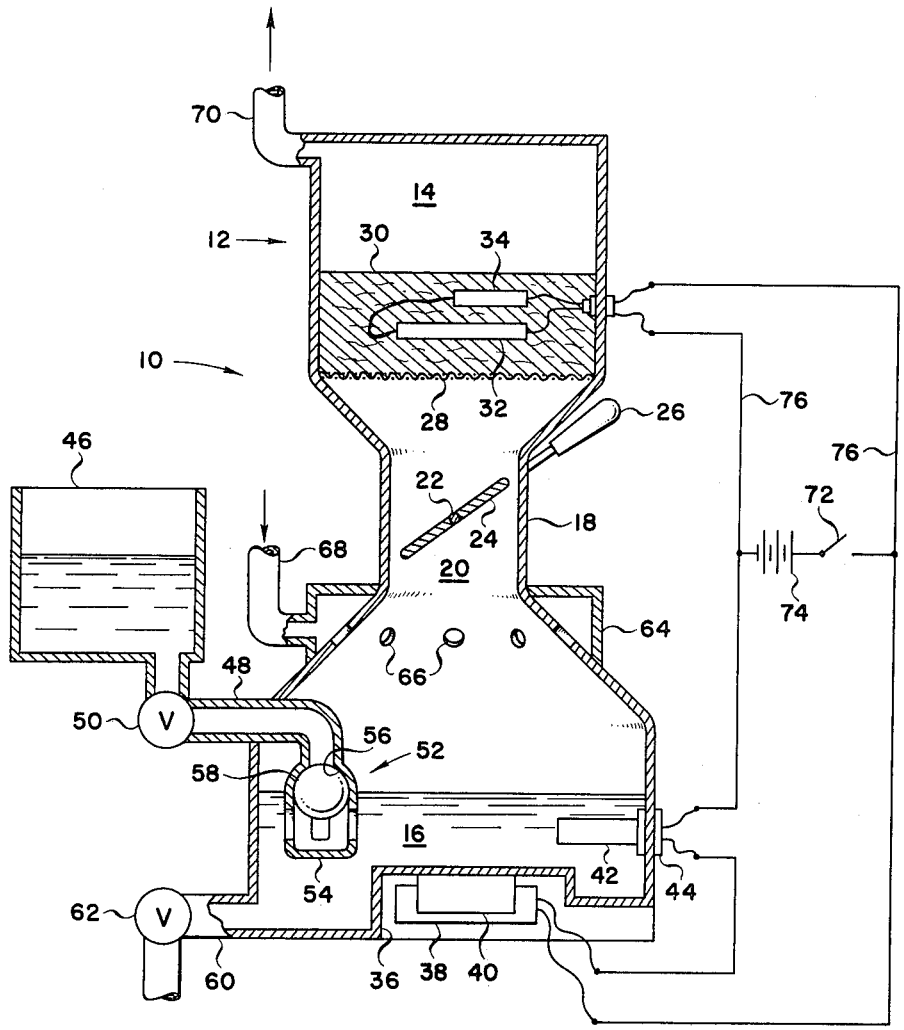
FIGURE 1 is a cross-sectional view of a catalytic combustor of the present invention showing various auxiliary parts used with this combustor in a schematic manner.

The invention is best more fully explained by referring to the accompanying drawings. In FIGURE 1 there is shown a catalytic combustor type heating device 10 of the present invention which includes a housing 12 formed so as to have an upper gas chamber 14, a lower fuel chamber 16 and a vertically extending passage 18 connecting these chambers 14 and 16. The passage 18 is provided with a "necked down" cylindrical center portion 20. This portion 20 is traversed by a rotatable shaft 22 supported by the housing 12. A disc-shaped vane 24 corresponding in dimension to the interior of the portion 20 is secured to the shaft 22 so as to be capable of being rotated. Such rotation may be accomplished through the use of a handle 26 secured to an extremity of the shaft 22 at the exterior of the housing 12. Other means of causing automatic rotation of this shaft 22 such as the use of servo motors, bimetallic springs or the like may be employed. It will, of course, be realized that such devices are auxiliary to the complete device 10.

At the upper end of the passage 18 in communication with the gas chamber 14 a comparatively heavy screen 28 is supported on the interior of the housing 12. This screen 28 in turn supports a bed 30 composed of known fibers such as asbestos-type fibers coated with a known catalyst for causing the combustion of a mixture of vaporous hydrocarbon fuel and oxygen from air when the catalyst within the bed 30 is at an elevated temperature. In order to raise this bed 30 to such a temperature upon starting of the device 10 a resistance heating element 32 is located within it; a thermostatically or temperature controlled On-Off switch 34 of conventional design is also located within this bed 30.

In a cavity 36 at the bottom of the fuel chamber 16 another similar heating element 38 is mounted upon the device 10 through the use of a metal spring clip 40. Another switch 42 corresponding to the switch 34 is mounted so as to extend into the fuel chamber 16 through the use of a bushing 44.

Fuel is supplied to the device 10 from a conventional reservoir 46 through a pipe 48 containing an on-off valve 50 through the use of a float-controlled valve 52. This float-controlled valve 52 includes a cage 54 having a spherically shaped valve seat 56 at its upper extremity and a ball 58 capable of floating in a liquid fuel located within this cage 54 so as to be capable of seating against the seat 58. A conventional drain pipe 60 and valve 62 lead from the bottom of the fuel chamber 16 for the purpose of draining this chamber whenever this is desired.

The device 10 also includes a manifold 64 extending completely around the exterior of the passage 18 immediately beneath the portion 20 of this passage. This manifold 64 preferably contains a plurality of spaced holes 66 leading from it into the interior of the housing 12. Although the device 10 may be operated with the manifold 64 open to the atmosphere, preferably it receives air through a supply pipe 68. Another similar pipe 70 leads from the uppermost extremity of the housing 12 for the purpose of removing exhaust gases from the gas chamber 14. This pipe 70 preferably extends a substantial distance above the housing 12 so as to achieve a so-called "chimney" effect serving to "pump" gases through the device 10 during its operation.

The operation of the device 10 is commenced by closing a switch 72 so as to supply power from a battery 74 through wires 76 to the heating element 32 and the switch 34 and to the heating element 38 and the switch 42. From a consideration of the drawing it will of course be realized that each of these switches is connected in series with its corresponding heating element and that the power is supplied from the battery 74 in parallel to the different heating elements employed.

The switch 34 is set so as to cause the bed 30 to be heated to a temperature of at least 400° F., and preferably at a higher temperature of from 450° to 750 ° F. with the type of catalyst indicated in the preceding for use with a hydrocarbon fuel. The switch 42 is preferably set at a temperature sufficient so as to cause vaporization of fuel within the chamber 16. The temperature at which such vaporization occurs will, of course, vary depending upon the specific fuel used. Virtually any liquid hydrocarbon fuel capable of being vaporized can be employed with the device 10.

Such heating causes the vapors of the fuel to rise through the passage 18 and through the porous bed 30. As this occurs air containing oxygen will be drawn through the holes 66 and will tend to become mixed with these fuel vapors so that by the time these gases reach the bed 30 they are mixed sufficiently so as to secure relatively complete combustion. Such combustion will occur at the surface of the catalyst within the bed 30 as soon as this bed is heated to within a temperature as indicated, and the products of this combustion will pass upwardly into the chamber 14 and out through the pipe 70.

As soon as the bed 30 becomes sufficiently hot to cause this combustion the switch 34 will open, cutting off power from the battery 74. In a similar manner the switch 42 will open when the fuel within the chamber 16 commences to vaporize. These switches will automatically close so as to cause additional heating during short periods if such heating is necessary to sustain the operation of the device 10. Normally such heating is not required by virtue of the fact that heat produced at the bed 30 will be conducted through the device 10 to a sufficient extent so as to cause vaporization of fuel as required. Some additional heat for this purpose will also be radiated toward the fuel chamber 16, but the amount of heat conveyed in this manner will be limited in accordance with the position of the vane 24.

This vane 24 is, of course, normally positioned so as to permit gas to flow past it. The orientation of the vane 24 with respect to the portion 20 of the passage 18 is preferably utilized in order to govern the operation of the device 10 so as to control or limit the amount of heat produced during the operation of this device. Such regulation is achieved by orienting the vane 24 so as to achieve essentially a valve action, limiting gas flow.

Figure 2:
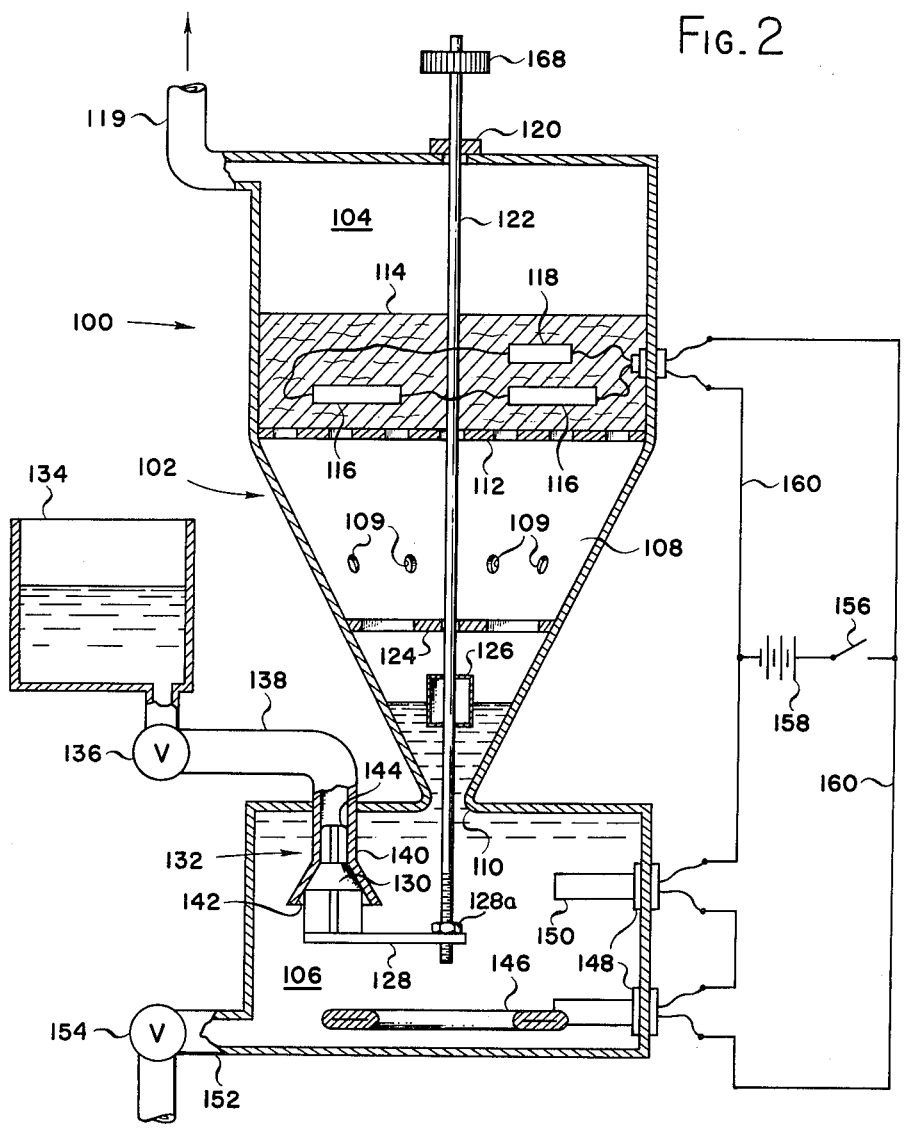
FIGURE 2 is a cross-sectional view which is similar to FIGURE 1 of a modified catalytic combustor of the present invention.

In FIGURE 2 of the drawings there is shown another catalytic combustor type heating device 100 of the present invention which also includes a housing 102 having a gas chamber 104, a fuel chamber 106, and a passage 108 connecting these two chambers. This passage 108 is preferably of the shape of an inverted frustum of a right circular cone so as to include a restricted inlet 110 leading into it from the fuel chamber 106. Air holes 109 are provided leading into the interior of the passage 108. At the upper end of the passage 108 a perforate steel plate 112 is supported on the housing 102; this plate in turn supports a catalyst bed 114 corresponding to the bed 30 previously described. This bed 114 contains several series-connected resistance heating elements 116 and a temperature controlled switch 118. A gas pipe 119 corresponding to the pipe 70 previously described leads from the chamber 104.

At the top of the gas chamber 104 there is provided a bushing 120 through which there is a control rod 122. This rod 122 extends through the gas chamber 104 and the passage 108 into the fuel chamber 106; as shown it also extends through the bed 114. If desired a perforate guide plate 124 may be located within the passage 108 for the purpose of preventing undesired shifting of this rod 122. A float 126 capable of floating upon a liquid fuel is secured to the rod 122 within the passage 108 adjacent to the inlet 110. At its lowermost extremity within the fuel chamber 106 the rod 122 is threaded into a nut 128a fixed to an arm 128 which in turn carries a tapered valve body 130 forming a part of a control valve 132 for controlling the flow of fuel from a reservoir 134 through a shut-off valve 136 and a pipe 138. This control valve 132 includes a body 140 of a cylindrical shape terminating in a valve seat 142 of a shape corresponding to the shape of the valve body 130. A cross-shaped guide 144 is attached to this valve body 130 so as to slide within the body 140 in order to prevent shifting of the body 130 with respect to the body 140.

In the fuel chamber 106 a ring-like resistance heating element 146 is mounted through the use of a bushing 148. A corresponding temperature controlled switch 150 is also mounted in a similar manner through the use of another bushing 148. A drain pipe 152 and valve 154 are also provided in connection with the fuel chamber 106 in order to drain this chamber when it becomes necessary.

During the use of the device 100 the operation of this device is started through closing a switch 156 corresponding to the switch 72 previously described in order to supply power from a battery 158 through wires 160 in order to actuate the resistance elements 116 and 146. Since the operation of these elements and their connected switches is essentially the same as in the device 10 it is not separately described herein.

However, the operation of the device 100 differs from the operation of the device 10 in several respects. As this device 100 is used heat will be radiated from the bed 114 as well as being conducted through the housing 102 back toward the fuel chamber 106. These factors are employed in order to govern the amount of fuel vaporized since the amount of fuel vaporized will vary depending upon the amount of exposed surface of fuel within the lower portion of the passage 108 as well as the distance from the bed 114 to the surface of the fuel. Thus, with the device 100, the amount of heat produced during the operation of this device can be regulated by moving the control rod 122 so as to vary the position of the float 126 so as in turn to vary the level of the fuel in the device. A gear wheel 168 is attached to the rod 122 so as to permit its being rotated by auxiliary equipment or by hand in order to accomplish such regulation.

Figure 3:
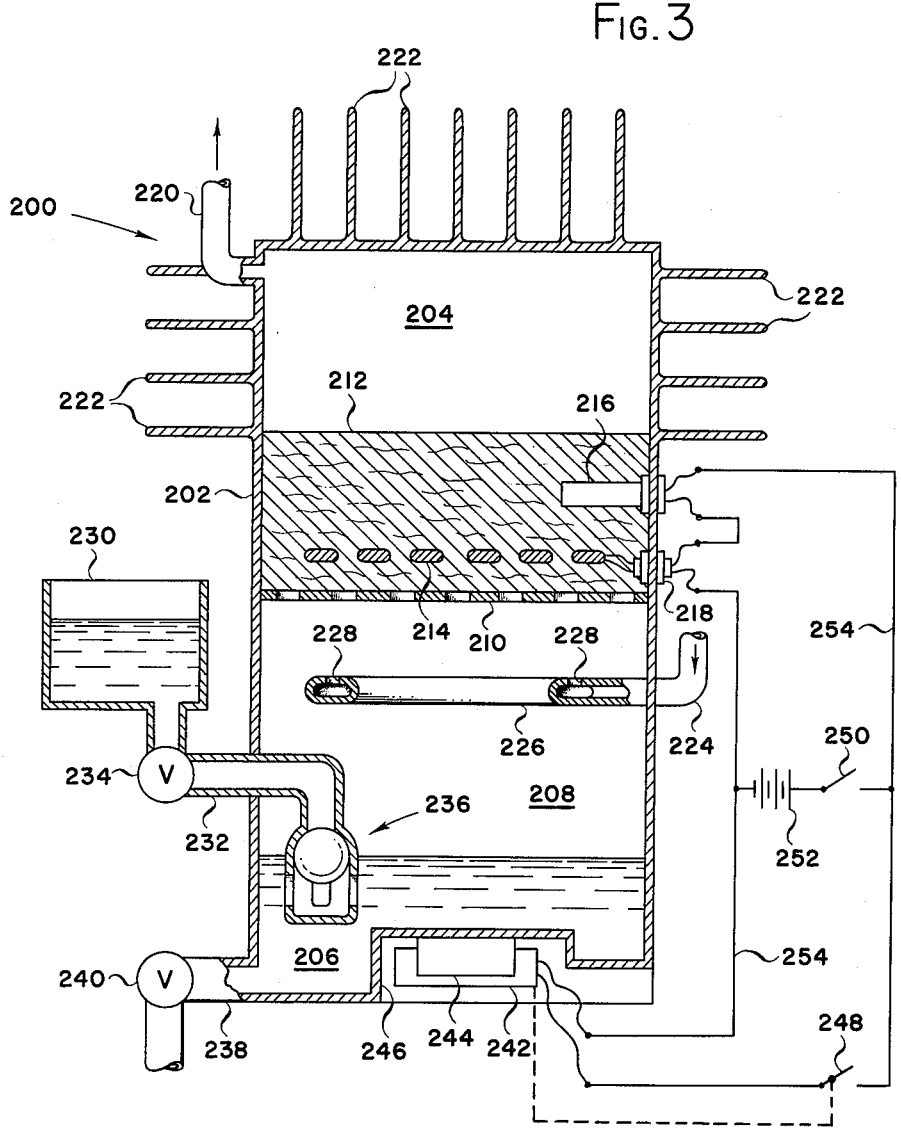
FIGURE 3 is a cross-sectional view similar to FIGURE 1 of a further modified catalytic combustor of the present invention.

In FIGURE 3 of the drawing there is shown another modified catalytic combustor type heating device 200. This device 200, like the devices 10 and 100, includes a metal housing 202 which is formed so as to define a gas chamber 204, a fuel chamber 206, and a vertically extending passage 208 extending between and connecting these two chambers. In the device 200 the chambers 204 and 206 and the passage 208 are of the same approximate internal dimensions for convenience of manufacture.

Within the interior of the housing 202 at the uppermost entremity of the passage 208 a perforated metal plate 210 is located at the end of the passage 208. This plate 210 holds a catalytic bed 212 corresponding to the catalytic bed 30 previously described. Within the bed 212 there is located an elongated resistance element 214 which is disposed so as to extend through the area across the housing 202 above this plate 210. Within the bed 212 there is also a thermostatic type temperature actuated switch 216. The element 214 and the switch 216 are both mounted on the housing through the use of appropriate conventional bushings 218.

In the device 200 a vent pipe 220 for gaseous products of combustion leads from the top of the gas chamber 204. This pipe corresponds to the pipe 70 previously described. Upon the housing 202 around the exterior of this gas chamber 204 projecting cooling fins 222 may be provided for the purpose of dissipating heat resulting from the operation of the device. Another pipe 224 is mounted on the housing 202 so as to lead into the interior of the passage 208. This pipe 224 supports and is in communication with the interior of a hollow-ring-like manifold 226 containing holes 228 which are directed upwardly toward the plate 210. This pipe 224 is used in a similar manner to the pipe 68 previously described in order to convey air into the interior of the passage 208.

In the device 200 a liquid fuel is supplied to the interior of the fuel chamber 206 from a reservoir 230 through a pipe 232 containing a shut-off valve 234. This pipe 232 is mounted upon the housing 202 and terminates in a float controlled valve 236. Since this valve 236 corresponds to the valve 52 previously described, various parts of it are not separately identified herein or in FIGURE 3 of the drawings. A conventional drain pipe 238 and a valve 240 lead from the fuel chamber 206 for the purpose of draining this chamber whenever this should become necessary. A resistance heating element 242 is held by means of a spring clip 244 in a cavity 246 at the bottom of the fuel chamber 206. The device 200 also includes another temperature controlled switch 248 which is located exteriorly of the housing 202 at a location which is to receive heat in the operation of this device 200.

The operation of the device 200 is essentially similar to the operation of the devices 10 and 100 previously described. When it is to be utilized a switch 250 is closed, causing current to flow from a battery 252 through wires 254 through the heating element 214 and the switch 216 and through the heating element 242 and the switch 248, switch 248 also being closed. From a consideration of the drawing it will be realized that the element 214 and the switch 216 are connected in series and that the heating element 242 and the switch 248 are also connected in series, and that power is supplied from the battery 252 in parallel to the two different heating elements 214 and 242 employed.

As these heating elements operate liquid fuel within the fuel chamber 206 will be caused to vaporize and air will be drawn into the housing 202 through the pipe 224. When the bed 212 reaches a sufficient temperature the mixture of air and fuel vapors rising within the interior of the housing 202 will react producing heat. Some of such heat will be conducted and radiated back to the fuel chamber 206 so as to cause the vaporization of additional fuel. At temperatures at which such combustion commences the switch 216 opens so as to inactivate the heating element 214.

During the operation of the device 200 the amount of fuel vaporization will be modulated or regulated through the operation of the external switch 248 since this switch will open or close so as to operate the heating element 242 in accordance with the temperature surounding this switch 248. In the device 200 this external switch 248 is considered to be particularly needed since the amount of heat which will either be conducted or radiated back to the fuel chamber 206 so as to cause vaporization of fuel will tend to be somewhat limited because of the effectiveness of the fins 222 in dissipating heat produced as a result of combustion.

Figure 4:
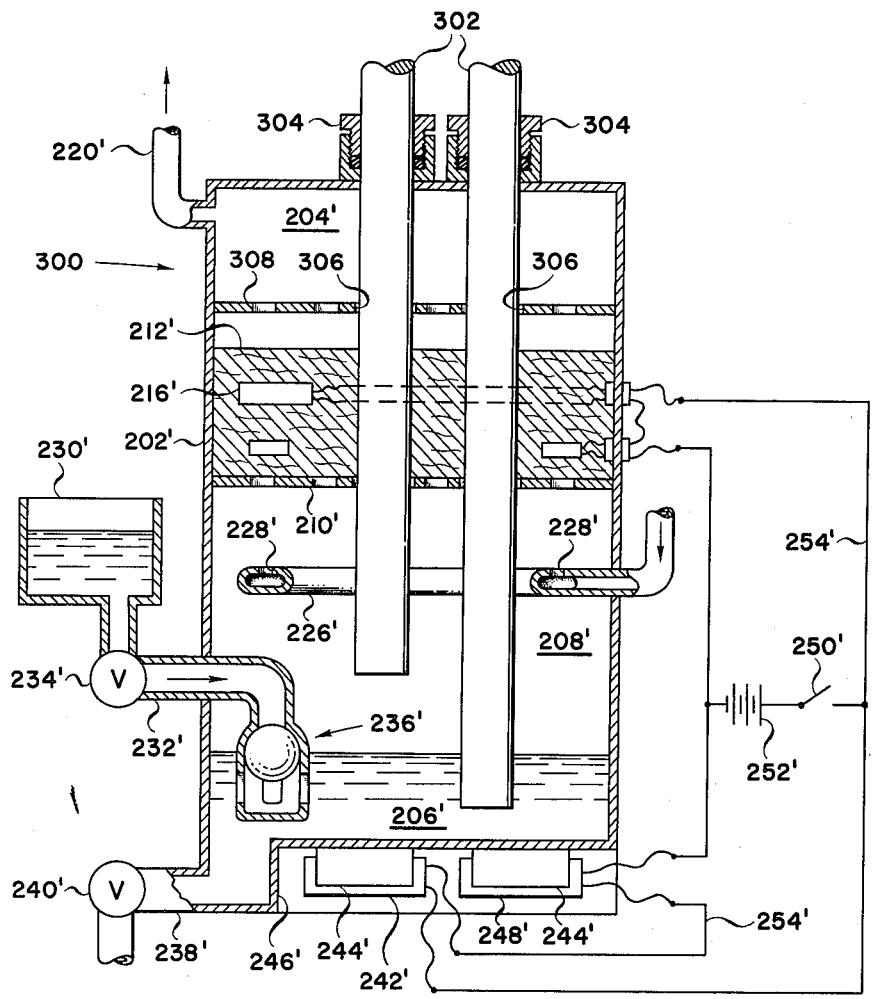
FIGURE 4 is a view similar to FIGURE 1 of another modified catalytic combustor of this invention.

In FIGURE 4 of the drawings there is shown another modified catalytic combustor type heating device 300. This device 300 is considered to be so closely related to and so similar to the device 200 described in the preceding that various parts of these two devices which are the same or essentially the same are not separately described herein. Such similar parts are designated both in the remainder of this specification and in the accompanying drawings by the primes of the numerals previously used to designate such parts.

The device 300 differs from the device 200 in that it does not utilize separate fins 222 for the purpose of dissipating heat. Indeed, this device 300 is primarily intended for use under relatively low temperature conditions where the vaporization of the fuel is desired without the use of external electric power or for use with fuels that heat from the combustion taking place within the device 300 may be returned directly to the fuel chamber 206' for the purpose of vaporization of fuel.

These rods 302 extend through conventional packing glands 304, through appropriate openings 306 in a perforated guide plate 308 mounted within the interior of the housing 202', through the bed 212' across the passage 208' into the fuel chamber 206'. With this type of construction the relative positions of the rods 302 may be adjusted by merely sliding them along their axes so that they are spaced with respect to the fuel chamber 206' in any desired manner depending upon the amount of heat which it is desired to conduct to the fuel chamber in order to regulate the heat conveyed to fuel within this chamber so as to control the vaporization of such fuel. Such adjustment can be accomplished manually or through the use of appropriate auxiliary mechanisms.

The device 300 also differs from the device 200 previously described in that the switch 248' is also mounted within the cavity 246' through the use of another clip 244'. This switch 248' in the device 300 is used in the same manner as the switches 42 and 150 in the devices 10 and 100, respectively. When the device 300 is being started this switch 248' controls the operation of the heating element 242' so as to start the initial vaporization of fuel until such time as the device 300 will become self-sustaining. At this point the switch 248' opens in the same manner in which the switch 216' opens when the bed 212' becomes sufficiently hot so that combustion will take place automatically within this bed.

From a consideration of this specification it will be realized that catalytic combustor type heating devices as herein described are capable of being controlled so that the quantity of heat given off by these units can be varied depending upon specific requirements. It will also be apparent that these catalytic combustors can easily be started with a minimum of difficulty without the use of special primer-type solvents or the like. It will be further realized that a number of different changes of a routine engineering skill may be made in the specific units illustrated in the drawings and described in the specification without departing from the inventive features or principles of this invention as defined in the appended claims.

What is claimed is:

1. A catalytic combustor type heating device which includes:
   (a) a housing having a lower liquid fuel chamber and means defining an open passage extending upwardly from said fuel chamber;
   (b) porous catalyst bed means for causing the combustion of a vaporous hydrocarbon fuel-oxygen mixture located so as to cover the extremity of said passage remote from said fuel chamber;
   (c) means for heating said catalyst bed means located within said catalyst bed means;
   (d) means for introducing a liquid hydrocarbon fuel capable of being vaporized into said fuel chamber;
   (e) means for introducing oxygen into said passage between said fuel chamber and said cataylst bed means;
   (f) independent means for heating fuel within said fuel chamber so as to vaporize said fuel;
   (g) means for operating both of said means for heating in order to cause the vaporization of fuel within said fuel chamber and in order to heat said catalyst bed means to a temperature at which said catalyst bed means is effective in causing the combustion of a vaporous hydrocarbon fuel-oxygen mixture; and
   (h) controllable means for regulating the quantity of fuel vaporized from said fuel chamber and flowing through said passage to said catalyst bed means and disposed between the oxygen introducing means and the catalyst bed.

2. A catalytic combustor type heating device as defined in claim 1 wherein said means for regulating comprises valve means located within said passage.

3. A catalytic combustor heating device comprising:
   (a) a continuous housing having a lower fuel chamber and an upper gas chamber connected by means defining an open passage therebetween;
   (b) a porous catalyst bed for causing combustion of a gaseous mixture of reactants capable of producing heat, said bed located in said upper gas chamber and covering the upper extremity of said passage means so as to require that all reactants entering said upper gas chamber pass through said bed;
   (c) exhaust gas outlet means in an upper extremity of said upper gas chamber;
   (d) means for introducing a fuel into said fuel chamber, said last mentioned means including a fuel level regulating means;
   (e) manifold means surrounding a portion of said housing and adapted for introducing oxygen into said housing so as to mix with vapors emanating from said fuel in a manner to support combustion when such mixture is passed through said catalyst bed;
   (f) mechanical regulating means disposed within said passage for regulating the quantity of reactant mixture passed through said passage to said catalyst bed;
   (g) separate electrically operated heater means respectively located in said catalyst bed for heating said catalyst bed and in heat transfer contact with a portion of said lower fuel chamber with which said fuel maintains direct contact for heating said fuel; and
   (h) separate thermostatically controlled switch elements respectively located in said catalyst bed and said lower fuel chamber to control said heating elements, said thermostatically controlled switch within said lower fuel chamber being located so as to be covered by fuel.

References Cited by the Examiner

UNITED STATES PATENTS

| | | | |
|---|---|---|---|
| 1,266,162 | 5/18 | Rosin | 158—96 |
| 1,948,298 | 2/34 | Howard | 158—96 |
| 2,074,168 | 3/37 | Danuser et al. | 158—28 X |
| 2,287,346 | 6/42 | Fishel | 126—93 X |
| 2,489,620 | 11/49 | Cartwright | 158—96 X |
| 2,657,744 | 11/53 | Newton | 158—53 |
| 3,102,577 | 9/63 | Dekker. | |

FOREIGN PATENTS

| | | |
|---|---|---|
| 799,717 | 4/36 | France. |
| 967,859 | 4/50 | France. |
| 420,835 | 12/34 | Great Britain. |

JAMES W. WESTHAVER, *Primary Examiner.*

FREDERICK KETTERER, *Examiner.*